A. J. ALLEN.
BASKET.
APPLICATION FILED DEC. 20, 1920.

1,394,463.

Patented Oct. 18, 1921.

Andrew J. Allen, INVENTOR:

BY

ATTORNEYS.

UNITED STATES PATENT OFFICE.

ANDREW J. ALLEN, OF LA GRANGE, ILLINOIS.

BASKET.

1,394,463.  Specification of Letters Patent.  Patented Oct. 18, 1921.

Application filed December 20, 1920. Serial No. 432,055.

*To all whom it may concern:*

Be it known that I, ANDREW J. ALLEN, a citizen of the United States, residing at La Grange, in the county of Cook and State of Illinois, have invented new and useful Improvements in Baskets, of which the following is a specification.

This invention relates to baskets and similar article carriers or receptacles, and more particularly to the lid or closure thereof, the object of the invention being to provide a novel and improved means for fastening the lid in place as will be described in detail hereinafter.

Figure 1:
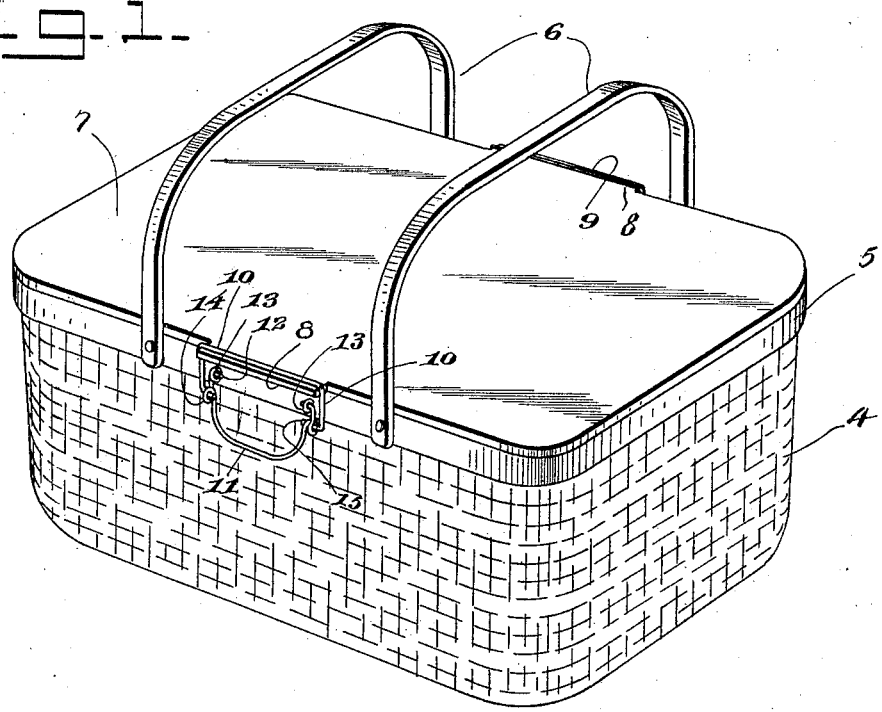
Figures 2, 3:
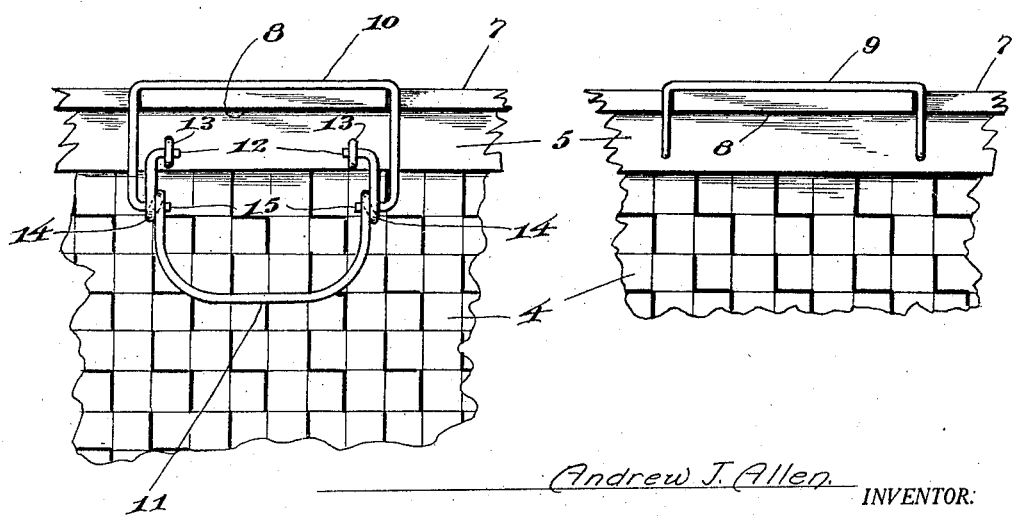

In order that the invention may be better understood reference is had to the accompanying drawing forming a part of this specification, and in said drawing, Figure 1 is a perspective view of the basket; Fig. 2 is an enlarged detail view showing a lid fastening device, and Fig. 3 is a similar view showing a coöperating device on the opposite side of the basket.

Referring specifically to the drawing, 4 denotes a basket of conventional design and constructed of any suitable material. The basket is reinforced at the top by a heavy band 5 to which is pivoted a pair of handles 6. A closure or lid is also provided for the basket, the same being a flat board 7 dimensioned to seat on the top edge of the basket. This lid may be a three-ply veneer board so that all likelihood of warping is eliminated. A means is provided for securely fastening the lid in place on the basket, such means comprising the following parts:

Midway between its ends, the opposite side edges of the lid 7 are formed to provide projections 8 which extend a short distance outwardly and beyond the plane of the basket sides, so that they may be engaged by locking bails carried by the latter, a bail 9 being engageable with one projection, and a bail 10 with the other projection.

The bail 9 is rigidly secured to the band 5 in such a position that the lid projection 8 on this side may be slipped under the same with a tight fit.

The bail 10 is detachable from the projection 8 on this side of the basket lid 7, and for this purpose it is carried by a lever 11 having the shape of a yoke, the two branches of the yoke having hook-shaped ends 12 loosely seating in eyes 13 carried by the reinforcing band 5 of the basket, whereby the pivotal connection of the lever with the basket is had. Adjacent to their pivoted ends, the yoke branches are coiled to form eyes 14 for connection with the bail 10, the two branches of the latter having hook-shaped ends 15 extending loosely into said eyes, whereby the bail and the lever are pivotally connected.

The connection between the bail 10 and the lever 11 is made below the pivotal connection between said lever and the basket. It will therefore be evident that the bail rises when the lever is swung upwardly and outwardly of the basket side, whereas when the lever is swung down toward the basket side, the bail is drawn downwardly. The bail can therefore be drawn down against the projection 8 to firmly clamp the lid 7 in place on the basket and make a tight joint, and at the same time the lid can be readily removed, this being done by disengaging the bail 10 from the projection 8 and slipping the other projection from out of the overhanging bail 9.

The lid fastening hereinbefore described requires no hinge connections between the lid and the basket, and it is serviceable and handy to operate, and also sanitary as it has no crevices or other parts where dirt can accumulate. The fastening also permits the lid to be reversed so that either side may be on the outside, and as the lid can be completely removed, large bundles can be easily placed in the basket. Any suitable material may be used in the construction of the basket according to the purpose for which it is to be used. The drawing shows an ordinary splint market basket. The fastening devices are constructed of wire, and hence they are cheap and easily applied.

I claim:

1. The combination with a receptacle having an open top and a lid seating on said top for closing the same; of bails carried by the receptacle sides for holding the lid in place, said lid having projections at its opposite edges over which the bails are adapted to seat, and a yoke-shaped lever carrying one of the bails and pivoted to the receptacle side, said bail being pivotally connected to the branches of the yoke-shaped lever below the pivotal connection between the latter and the receptacle side.

2. The combination with a receptacle having an open top and a lid seating on said top for closing the same; of a bail fastened to one side of the receptacle, a swinging bail on the other side of the receptacle, the lid having projections at its opposite edges adapted to seat under the bails, and a yoke-shaped lever carrying the second-mentioned bail and pivoted to the receptacle side, said bail being pivotally connected to the branches of the yoke-shaped lever below the pivotal connection between the latter and the receptacle side.

3. The combination with a receptacle having an open top and a lid seating on said top for closing the same; of a bail fastened to one side of the receptacle, a swinging bail on the other side of the receptacle, the lid having projections at its opposite edges adapted to seat under the bails, and means for clamping the second-mentioned bail down on the projection beneath the same.

In testimony whereof I affix my signature.

ANDREW J. ALLEN.